May 29, 1934.                A. S. BARROWS                1,960,935
                               HAND BRAKE
                           Filed May 11, 1932          2 Sheets-Sheet 1
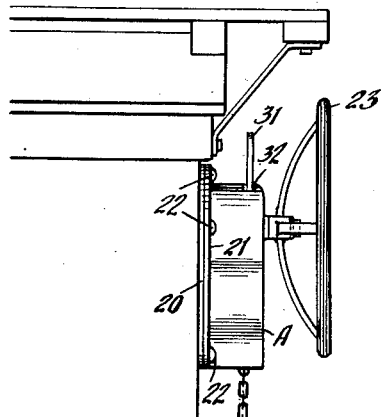
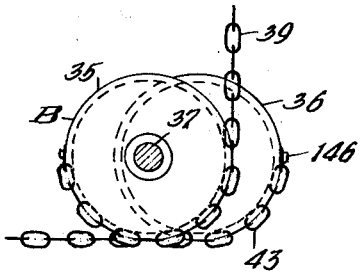
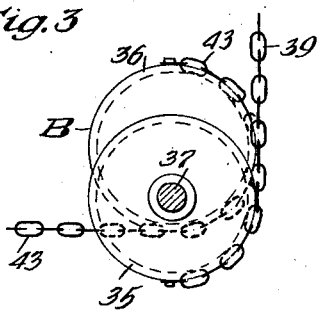
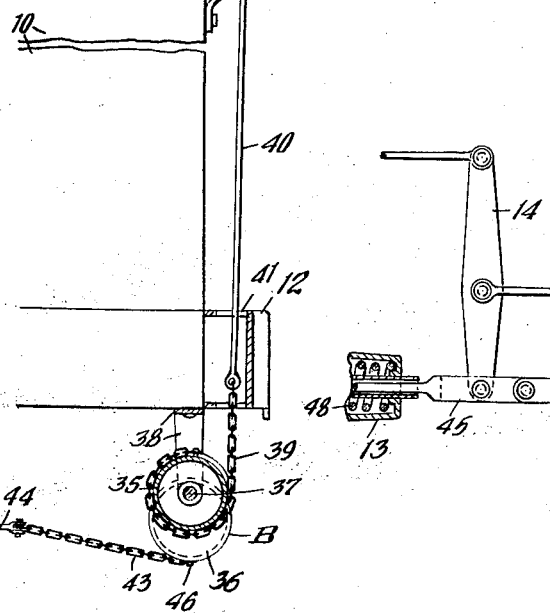
Inventor
Allan S. Barrows
By Joseph Harris
His Atty.

May 29, 1934.    A. S. BARROWS    1,960,935
HAND BRAKE
Filed May 11, 1932    2 Sheets-Sheet 2

Inventor
Allan S. Barrows
By Joseph Harris
His Atty.

Patented May 29, 1934

1,960,935

UNITED STATES PATENT OFFICE 1,960,935

HAND BRAKE

Allan S. Barrows, Los Angeles, Calif.

Application May 11, 1932, Serial No. 610,560

2 Claims. (Cl. 254—149)

This invention relates to improvements in hand brakes especially adapted for railway freight cars.

One object of the invention is to provide an economical, simple, and efficient hand operated brake wherein the initial movements of the power applying unit serve to rapidly take up all slack in the train of mechanism between the power unit and the brake proper, with a gradual automatically increasing mechanical advantage.

Another object of the invention is to provide a hand brake of the type indicated wherein the power may be effectively applied with the brakeman using one hand to apply the power through the brake wheel while utilizing the other hand for supporting himself in order to promote safety of operation.

Another object of the invention is to provide a hand brake wherein is employed a motion-transmitting means between the power applying unit proper and the brakes, the power applying unit proper having a gradually increasing mechanical advantage as the same is operated to apply the brakes, which gradually increasing mechanical advantage is compounded with a gradually increasing mechanical advantage in the operation of the motion transmitting means to thereby accelerate the take-up of all slack with an ultimate very high leverage ratio application of the power to the brakes.

A still further object of the invention is to provide a hand brake of the type above indicated wherein not only any normal amount of slack may be effectively taken care of but any unusual or emergency condition of slack may likewise be taken care of in efficiently applying the brakes manually.

Another object of the invention is to provide a hand brake of the character hereinbefore indicated which may be applied to new or old freight car equipment without necessitating any changes in the standard types of brake riggings.

Other objects of the invention will more clearly appear from the description and claims hereinafter following, taken in connection with the drawings.

Figure 5:
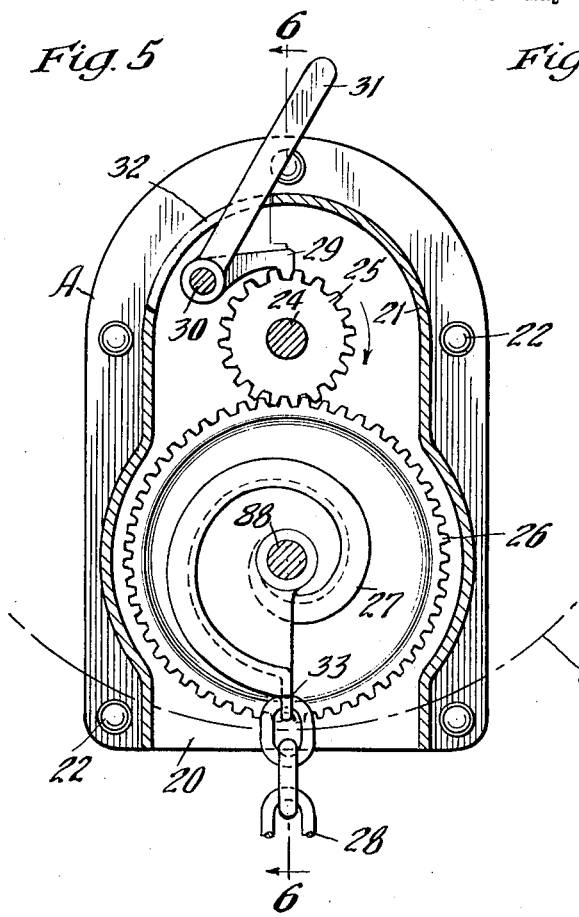

In the drawings forming a part of this application, Figure 1 is a part elevational view, part vertical sectional view of the end portion of a freight car showing the improvements applied thereto, the parts being shown in normal or full release condition. Figure 2 is an enlarged, elevational view of the motion transmitting means employed showing the relative positions of the parts at the end of a 90° rotation from the position shown in Figure 1. Figure 3 is a view similar to Figure 2 but showing the relative positions of the parts at the end of 180° movement. Figure 4 is a top plan view with certain parts in section showing the brake lever and portion of an air brake cylinder associated with the hand brake features. Figure 5 is a vertical, sectional view, upon a somewhat enlarged scale, of the hand operated power applying unit proper and corresponding substantially to the line 5—5 of Figure 6. And Figure 6 is a vertical, sectional view at right angles to Figure 5 and corresponding to the section line 6—6 of Figure 5.

In said drawings, the end wall of a box freight car is indicated at 10, the usual brakeman's platform at 11, the end sill at 12, a portion of the air brake cylinder at 13; the brake lever at 14; the improved power unit at A; and the motion transmitting device at B.

Figure 6:
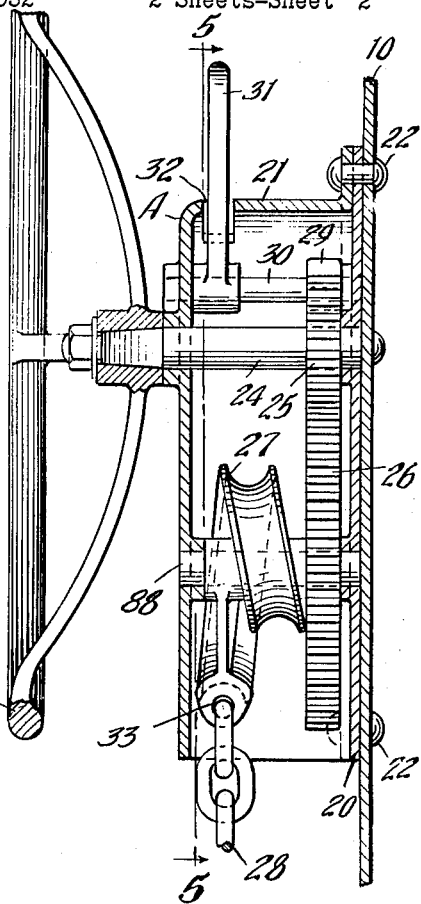

Referring first to the hand operated power applying unit proper and particularly Figures 5 and 6, the same preferably comprises a base plate 20 riveted or otherwise rigidly secured to the car end wall near the top thereof; a housing 21 secured to the base plate 20 preferably by the same securing rivets 22; a hand wheel 23 mounted on a shaft 24, the latter being journaled in suitable bearings provided by the base plate 20 and housing 21, as clearly shown in Figure 6. Secured to the inner end of the shaft 24 is a driving gear 25 in mesh with a driven gear 26, the latter being integrally or otherwise rigidly associated with a spiral chain winding drum 27, rotatably mounted on a shaft 88 suitably supported in the housing and bearing plate 21—20. To prevent accidental unwinding of the pull-up chain 28, a gravity controlled locking dog 29 is employed cooperable with the gear 25, said dog being suitably pivoted on a shaft 30 and having rigidly associated therewith a release handle 31 normally extending upwardly through an opening 32 in the housing so that the outer end thereof is exposed and adapted to be manipulated to release the dog when it is desired to release the brakes. As will be clear from inspection of Figure 5, the dog 29 and handle 31 are so formed and related that the action of gravity normally tends to keep the dog 29 in operative engagement with the gear 25. The length of the slot 32 will be made such that, when the dog and handle are moved to full release, they will remain there under gravity influence until manually returned to operative position.

The spiral chain winding drum 27 is of maximum radius where the chain 28 is attached or first begins to wind thereon, as indicated at 33, so that, as the power unit is operated with the hand wheel rotated clockwise, as viewed in Figure 5, the drum will be rotated counter-clockwise and the chain 28 wound thereon rapidly during the initial portion of the operation and with a gradually decreasing speed of take-up but with a correspondingly increasing mechanical advantage or leverage ratio, it being obvious also that there is a mechanical advantage in the gear ratio between the gear 25 and gear 26. From the preceding, it will be seen that, insofar as the pull-up chain 28 is concerned, it is initially taken up rapidly and toward the end of a normal application, the leverage ratio or mechanical advantage of pull on the chain 28 becomes relatively high.

Referring now more particularly to those portions of the structure shown on the first sheet of the drawings, the motion transmitting device B, as shown, preferably comprises two chain drums 35 and 36 cast integrally for economy and mounted on a shaft 37, supported in a depending bracket 38 secured to the underframe or end sill of the car adjacent the end sill, as best shown in Figure 1. The drum or sheave wheel 35 is mounted concentric with the shaft 37, as shown. The chain 39 which winds thereon, the link 40 and the upper chain 28 constitute a flexible connection from said drum 35 direct to the power unit, the parts passing through suitable openings 41 in the end sill and opening 42 in the platform 11. The sheave wheel 35 is so disposed that the chain 39, in unwinding therefrom, passes upward substantially vertically so as to obtain as direct a pull as possible from the power unit.

The other drum or sheave wheel 36, as shown, is disposed eccentric with the shaft 37 and drum 35 and from the drum 36 runs the brake chain 43, connecting through link 44 with the brake lever 14 and piston rod 45.

The normal or full release position of the motion transmitting device B, considered as an entirety, is as shown in Figure 1, wherein it will be noted that the chain 39 is wrapped around the drum 35 for approximately 270° and the drum 36 is in its most dependent eccentric position with reference to the shaft 37 and with the brake chain 43 attached thereto substantially at the bottom point as indicated at 46.

With the drum 35 concentric, it will be observed that the lever arm of the power applied thereto through the chain 39 remains constant, that is, a pull up on the chain 39 of a given amount will always produce an angular movement of the drum 35 of given amount. As the flexible connection to the power unit is drawn upwardly by operating the power unit proper, the point of attachment 46 of the brake chain 43 moves from the position shown in Figure 1 to the position shown at 146 in Figure 2 at the end of a 90° movement of the drum 35. As will be apparent, this involves a rapid take-up of the brake chain during the first 90° movement with a corresponding increase in leverage ratio or mechanical advantage between the power applied to the drum 35 and the load taken off by the brake chain 43. The initial leverage ratio between the lever arms of the drums 35 and 36 in the neutral position shown in Figure 1 is approximately 2—3 and at the end of the first 90° movement shown in Figure 2, has become approximately 1—1. As the power is further applied during the next 90° movements from the position shown in Figure 2 to the position shown in Figure 3, the mechanical advantage becomes very much higher, although the speed of take-up of the brake chain has been correspondingly reduced. In Figure 3, the mechanical advantage has become approximately 3—1, thus permitting of an exceedingly high powered application of the braking force to the car wheels. In this connection, it will be further observed that not only is the mechanical advantage of transmitting power through the unit B gradually increased during the 180° movement referred to but, simultaneously therewith, there is the added or compounded mechanical advantage obtained in the power unit proper, previously described. It will be seen, therefore, that the combination provides for an exceedingly quick take-up of a slack throughout the entire transmitting system between the power unit proper and the brake lever system with a rapidly increasing leverage ratio or mechanical advantage.

In freight car operation, the average piston travel is approximately eight inches with a maximum limit of piston travel of twelve inches. An average amount of slack and one which should not be normally exceeded is about four inches in the brake chain so that, for average conditions, the total amount of slack plus piston travel to be provided for is approximately twelve inches. To provide, therefore, for taking up this amount of slack in 180° normal maximum turning movement of the unit B, the diameters of the drums 35 and 36 will be preferably about eight inches so that, for any condition of slack encountered in normal cases, the most effective application of the power will be obtained during the movement of the unit B from the position shown in Figure 2 to the position shown in Figure 3, with the ultimate condition as shown in Figure 3.

In actual practice, however, abnormal or emergency conditions frequently occur which necessitate a greater amount of take-up of the brake chain which may amount to 16 or 18 inches, including the maximum possible travel of twelve inches of the piston. To provide for this, it will be observed that the unit B is capable of at least an additional 90° of rotation beyond the position shown in Figure 3 and while there is a correspondingly slightly decreasing mechanical advantage, nevertheless the mechanical advantage in said unit is amply sufficient to take care of such emergency conditions, it being observed that the chain winding drum 27 of the power unit proper will be made of sufficient capacity to provide for the necessary winding up of the pull-up connection and that the mechanical advantage in the power unit proper is constantly increasing even during the latter part of such extreme movements.

Referring more particularly to Figures 1, 2 and 3, it will be seen that the unit B is so made that it is overbalanced in such manner that the two drums will, when free and under the influence of gravity, normally assume the position shown in Figure 1 so long as the rotating movement does not exceed 180° or pass beyond the position shown in Figure 3. During the application of the brakes, it will be observed that the spring 48 in the cylinder 13 is compressed so that, not only does said spring assist in returning the parts to normal position when operated within the usual range but, in the event an emergency application is encountered where the unit B is rotated more than 180° and beyond the position shown in Figure 3, the spring 48 and the general tension set up in the brake chain and brake rigging will co-operate to insure the positive return of the parts, and particularly the unit B, to its proper neutral position under full release.

From the preceding description, it will be seen that, under full release, the parts will always assume the same position regardless of the amount of slack in any of the connections and hence, the effectiveness of the transmission of the power will always obtain. Furthermore, the improvements are such that they may be incorporated in all standard brake rigging arrangements without modification; there is no danger of binding of any of the flexible connections or other parts; and the motion transmitting unit B always retains a definite location rotating about a fixed axis and is free from sliding mountings, movable bearings and shifting connections such as have heretofore been suggested and the operation of which become uncertain and unsafe under the severe conditions of service.

The two drums 35 and 36, as previously described, are preferably cast integrally as shown, but it will be obvious that the same might be separated transversely of the car so long as they are rigidly associated and operate in unison. It will further be seen that various changes and modifications may be made in the contours of the drums 35 and 36 and the specific leverage ratios and rates of change of ratios as the angular positions of the two drums change, without departing from the spirit of the invention. Other changes and modifications within the scope of the invention will suggest themselves to those skilled in the art and all such changes and modifications are contemplated as come within the scope of the claims appended hereto.

What is claimed is:

1. In combination with a brake rigging of a railway car, a brake chain for moving the rigging to set the brakes; a power-applying chain adapted to be actuated with a power unit of the pull-up type; and leverage ratio changing and motion transmitting means operatively associated with and interposed between said chains, said means comprising a power chain drum and a brake chain drum rigidly associated to rotate in unison about a fixed axis parallel and adjacent the end sill of the car and so located that the power applying chain passes off of its drum in a substantially upward vertical direction in a plane outwardly of the end wall of the car, the effective ratio of the radii of the chain winding surfaces of the power chain drum to that of the brake chain drum increasing as said means are operated from initially full release position by unwinding of the power chain from its drum and simultaneous winding of the brake chain on its drum to a point corresponding to the take-up of a normal amount of slack in the brake chain plus the lever movement, each of said drums having also additional reserve chain winding capacity thereafter available to apply the brakes in accommodating an abnormal excessive amount of slack in the brake chain, the effective center of weight of the two drums being eccentric to the axis of rotation thereof and such that it, under the influence of gravity, will normally position the two drums in said fully released position when the power chain is released after any actuation of said means within the limits corresponding to the take-up of a normal amount of slack in the brake chain, plus the lever movement.

2. In combination with a brake rigging of a railway car, a brake chain for moving the rigging to set the brakes; a power-applying chain of the pull-up type; and leverage ratio changing and motion transmitting means operatively associated with and interposed between said chains, said means comprising a power chain drum and a brake chain drum rigidly associated to rotate in unison about a fixed axis parallel and adjacent the end of the car and so located that the power applying chain passes off of its drum in a substantially upward vertical direction, the effective ratio of the radii of the chain winding surfaces of the power chain drum to that of the brake chain drum increasing as said means are operated from initially full release position by unwinding of the power chain from its drum and simultaneous winding of the brake chain on its drum to a point corresponding to the take-up of a normal amount of slack in the brake chain plus the lever movement, each of said drums having also additional reserve chain winding capacity thereafter available to apply the brakes in accommodating an abnormal excessive amount of slack in the brake chain, the effective center of weight of the two drums being eccentric to the axis of rotation thereof and such that it, under the influence of gravity, will normally position the two drums in said fully released position when the power chain is released after any actuation of said means within the limits corresponding to the take-up of a normal amount of slack in the brake chain, plus the lever movement.

ALLAN S. BARROWS.